April 4, 1939.   F. F. HOSMER   2,152,886
TWO-SPEED BICYCLE TRANSMISSION
Filed Feb. 17, 1937   2 Sheets-Sheet 2
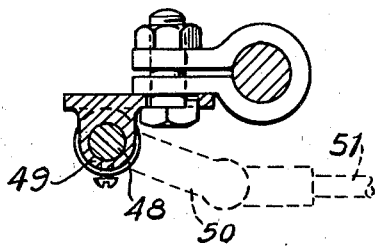
Fig. 6.
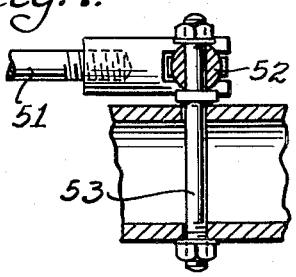
Fig. 7.
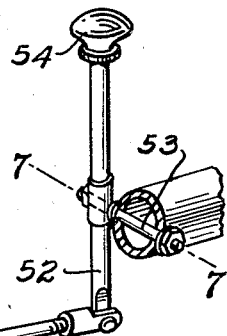
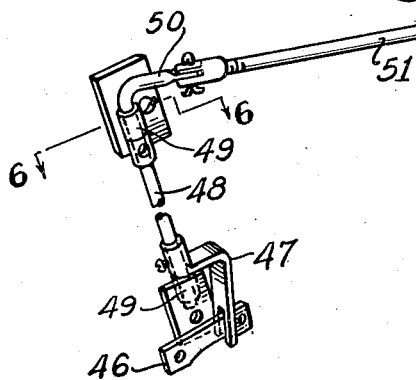
Fig. 5.
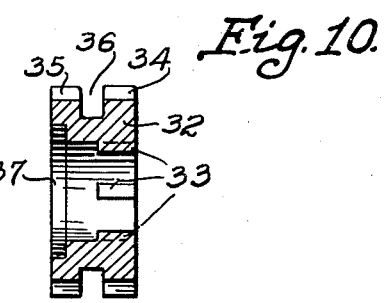
Fig. 10.
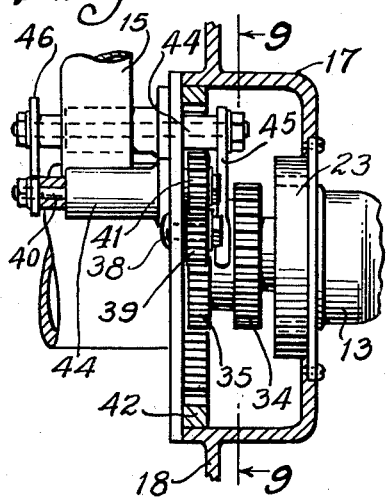
Fig. 8.   Fig. 9.
INVENTOR.
Frank F. Hosmer
BY
ATTORNEY.

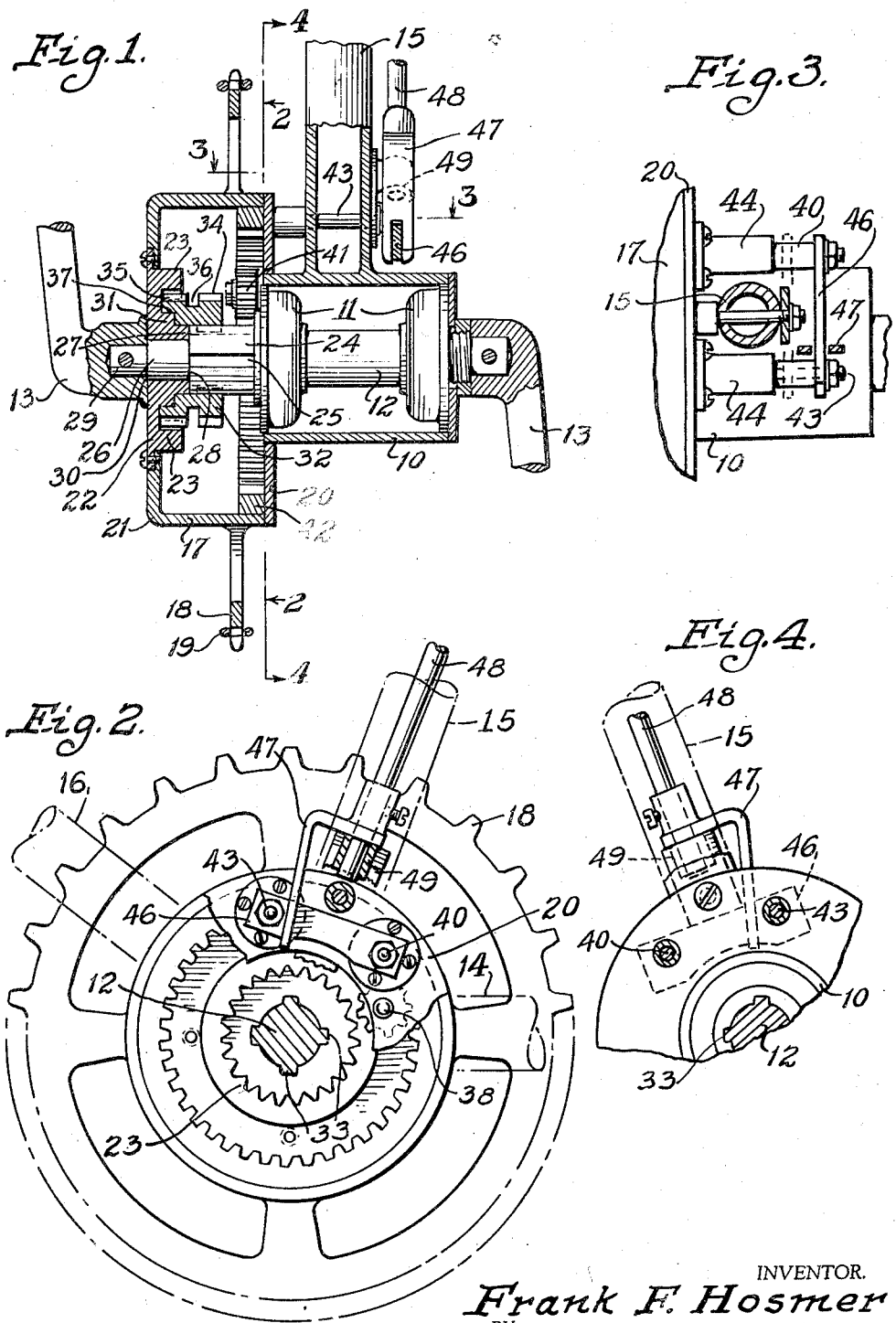

Patented Apr. 4, 1939

2,152,886

UNITED STATES PATENT OFFICE 2,152,886

TWO-SPEED BICYCLE TRANSMISSION

Frank F. Hosmer, Glendale, Calif.

Application February 17, 1937, Serial No. 126,216

4 Claims. (Cl. 74—332)

My invention relates generally to bicycles and more particularly to the means for transmitting the motion and power from the pedal driven shaft to the rear wheel of the bicycle, and the principal objects of my invention are to generally improve upon and simplify the construction of the existing forms of bicycle transmissions and to provide a relatively simple and efficient rotary and sliding structure that will transmit two different speeds to the rear wheel of the bicycle, and the device being constructed so that the pedal driven shaft positively drives the bicycle at either high speed or low speed.

A further object of my invention is to provide a two-speed transmission for bicycles that is capable of being readily applied to standard makes of bicycles, and the transmission being under ready control of the rider of the bicycle through a simple arrangement of associated parts, including a lever, and which latter, when actuated, shifts the transmission from high to low and vice versa.

With the foregoing and other objects in view my invention consists in certain novel features of construction and arrangement of parts that will be hereinafter more fully described and claimed and illustrated in the accompanying drawings, in which:

Fig. 1 is a vertical section taken through the pedal shaft bearing of a bicycle and showing my two-speed transmission associated therewith.

Fig. 2 is a section taken on the line 2—2 of Fig. 1.

Fig. 3 is a horizontal section taken approximately on the line 3—3 of Fig. 1.

Fig. 4 is a detail section taken approximately on the line 4—4 of Fig. 1.

Fig. 5 is a perspective view of the lever actuated parts utilized for shifting the transmission from one position to another.

Fig. 6 is a horizontal section taken approximately on the line 6—6 of Fig. 5.

Fig. 7 is a horizontal section taken approximately on the line 7—7 of Fig. 5.

Fig. 8 is a vertical section taken approximately through the center of the gear housing of the transmission and showing the means utilized for shifting the sliding gear of the transmission.

Fig. 9 is a cross section taken approximately on the line 9—9 of Fig. 8.

Referring by numerals to the accompanying drawings which illustrate a preferred embodiment of my invention, 10 designates the conventional cylindrical housing that contains anti-frictional bearings 11, preferably of the ball type for the shaft 12 on the ends of which are mounted pedal carrying crank arms 13.

Formed integral with and extending rearwardly from the housing 10 is a bicycle frame member 14, the rear portion of which is formed for the reception of the rear wheel and extending upwardly and slightly rearwardly from housing 10 is a frame member 15 that receives in its upper portion the seat supporting bracket.

Extending upwardly and forwardly from the front of housing 10 is a frame member 16 that is connected at its forward end to the frame member that receives the steering column.

A portion of shaft 12 projects beyond bearing 10 and mounted for rotation on said projecting portion is a gear housing 17 that includes a circumferential wall with which is formed integrally a sprocket wheel 18, which latter receives the conventional sprocket chain 19 that transmits rotary motion and power to a smaller sprocket wheel carried by the axle of the rear wheel.

The inner end of housing 17 is closed by a plate 20 that is mounted upon the left hand end of housing 10 and detachably connected to the central portion of the outer wall 21 of housing 17 is a disk 22 with the inner face of which is formed integrally an internal clutch member 23.

That portion of the pedal shaft 12 that projects into the housing 17 is slightly enlarged, as designated by 24, and formed in the periphery of said enlarged portion are longitudinally disposed grooves 25.

That portion 26 of the pedal shaft beyond the enlarged portion 24 constitutes a support for a bearing 27 that is formed integral with and projects inwardly from the removable disk or plate 22 and the shoulder 28 between the portions 24 and 26 of the shaft engages directly against the inner end of said bearing 27.

The end portion 29 of the shaft beyond the portion 26 projects beyond the outer face of disk 22 and receives one of the pedals 13, and the shoulder 30 between the portions 26 and 29 lies flush with the outer face of disk 22 so as to provide a bearing for the end of the pedal crank 13 that is mounted on the projecting end 29.

Formed integral with the inner face of disk 22 and the adjacent portion of bearing 27 is a circumferential flange 31.

Arranged for longitudinal sliding movement on the enlarged portion 24 of the pedal shaft is a sleeve or collar 32 and formed integral therewith are splines 33 that are positioned in the grooves 25.

Formed on the periphery of the collar or sleeve 32 are two sets of teeth 34 and 35, the same being separated by a groove 36 that is formed in the periphery of collar 32.

Formed on the outer portion of collar 32 is a circumferential groove 37 that receives the circumferential groove 31 when the collar 32 has moved to its outer limit of movement. When this collar is shifted to its outer limit of movement, the clutch teeth 35 engage the teeth of the internal clutch member 23 and thus the latter, together with housing 17 and the sprocket 18, will be directly driven from and at the same speed as the pedal carrying shaft 12.

Mounted on a pin or stud 38 that is seated in the removable inner wall 20 of the housing 17 is a small gear wheel or pinion 39 with which the gear teeth 34 on the sliding pedal gear are adapted to engage when the collar is moved to its limit of movement toward the housing 10.

Mounted for rotation on a pin 40 that is arranged for sliding movement through wall 20, is a pinion 41 which, as said rod is moved lengthwise, moves into and out of engagement with the teeth of an internal ring gear 42 that is formed integral with or fixed to the inner face of the circumferential wall of housing 17 adjacent the inner wall 20 thereof.

The pinions 39 and 41 are preferably of the same diameter and as the rod 40 is moved lengthwise the pinion 41 is moved into or out of engagement with the pinion 39 that is mounted for rotation on stud 38, but does not move lengthwise thereon.

Thus when the teeth 34 of the sliding sleeve 32 are in engagement with the teeth of pinion 39 the rotary motion of the pedal driven shaft 12 is transmitted from said pinion 39 to pinion 41 and from thence through the internal ring gear 42 to housing 17 that carries the sprocket wheel 18.

The parts just described are arranged and the diameters of the various gears are such that there is no intermediate or neutral position of the sliding sleeve as the same is shifted from one position to the other.

As sleeve 32 is moved to disengage teeth 34 from pinion 39 the teeth 35 of said sleeve enter and engage the teeth of clutch member 23 immediately following the disengagement of the teeth 34 with the teeth of pinion 39. This condition also exists when sleeve 32 is shifted so as to disengage the teeth 35 from the teeth of clutch member 23 and to effect an engagement of the teeth 34 with the pinion 39, and which latter condition drives the rear wheel of a bicycle at slow speed.

When sleeve 32 carrying the teeth 34 and 35 is moved lengthwise upon the grooved portion 24 of shaft 12 so that the teeth 35 engage the teeth of clutch member 23, pinion 41 is simultaneously moved so that it is disengaged from the teeth of ring gear 42 and from the teeth of pinion 39, and thus when the transmission is being operated at high speed the driving connection from the pedally driven shaft to the internal ring gear 42 carried by housing 17 is positively open or disengaged.

The means utilized for shifting the double pinion or gear wheel into and out of engagement with the clutch member 23 and the pinion 39 is illustrated in Figs. 2 to 7 inclusive.

This means includes the rod 40 and a similar rod 43 that are arranged for sliding movement through bearings 44, the latter being mounted in the side wall of plate 20 of housing 17. The end of rod 43 within the housing 17 carries a yoke 45, the bifurcated lower end of which enters the groove 36 in the sleeve 32.

The outer ends of rods 40 and 43 are connected by a cross bar 46 and engaging the latter is the notched or slotted lower end of a crank arm 47. The upper end of this crank arm is secured to a shaft 48 that extends alongside the upright member 15 of the bicycle frame, and said shaft being mounted for rotation in bearings 49 that are secured to said upright member 15.

The upper end of shaft 48 is bent at right angles to form a short crank arm 50 and pivotally connected thereto is one end of a rod 51 that extends alongside of one of the upper members of the bicycle frame.

Pivotally connected to the opposite end of rod 51 is the lower end of an upright hand lever 52, the latter being mounted for swinging movement on a horizontal axis 53 that is seated in the upper portion of the bicycle frame. The upper end of lever 52 is provided with a knob 54 and as said lever is swung on its axis the rod 51 will be moved forwardly or rearwardly as the case may be, thereby rocking shaft 48 and swinging crank arm 47 to move cross bar 46 toward or away from housing 17.

As the cross bar 46 is moved toward the housing, rods 40 and 43 are moved through their bearings 44 and yoke 45 slides the sleeve 32 upon the enlarged grooved portion 24 of shaft 12 so that teeth 35 are engaged with the teeth of clutch member 23.

When so positioned the pedally driven shaft 12 directly drives housing 17 and the sprocket wheel 18 carried thereby will actuate the sprocket chain 19 to drive the rear wheel of the bicycle at high speed. At the same time, the yoke 45 is thus actuated to move the sleeve 32, rod 40 will be moved inward to carry pinion 41 out of engagement with the teeth of internal ring gear 42 and also out of engagement with the teeth of pinion 39, thus entirely disengaging any driving connections to internal ring gear 42.

When the lever 52 and associated parts are actuated so as to move cross bar 46 away from housing 17, the teeth 34 on the sleeve 32 will engage with the teeth of pinion 39 which is in engagement with the teeth of pinion 41, and at the same time the lengthwise movement imparted to rod 40 will move pinion 41 into engagement with the teeth of internal ring gear 42 and with the teeth of pinion 39 so that the motion of the pedally actuated shaft 12 will be transmitted at reduced speed through gear teeth 34, pinion 39 and pinion 41 to the internal gear teeth 42 that are secured to housing 17, so that the latter will be driven at relatively slow speed, and such speed transmitted to the rear wheel.

It will be understood that when the bicycle is being propelled on approximately level surface, the teeth 35 of the sleeve 32 are in mesh with the teeth of internal ring 23, and under such conditions the rear wheel of the bicycle is directly driven at relatively high speed from the pedally actuated shaft 12.

When driving the bicycle uphill, which requires the application of power, the sleeve 32 is shifted so that the teeth 34 engage the teeth of pinion 39 and the latter engaging the teeth of pinion 41 and as the latter is in engagement with the teeth of internal ring gear 42 the speed of rotation imparted to the rotating housing 17 is materially reduced and the power is increased through the gear arrangement that includes the teeth 34 of the sleeve 32, the pinions 39 and 41 and the relatively large internal ring gear 42.

My improved transmission is particularly intended to be used in connection with bicycles having conventional coaster brakes which as will be understood function as a clutch and when the feet of the rider stop driving the pedals of the bicycle and said pedals and the shaft 12 are at rest, the shift of the two speed transmission is accomplished.

Thus it will be seen that I have provided a two-speed transmission for bicycles that is relatively simple in construction, inexpensive of manufacture and capable of being easily applied to the standard makes of bicycles, and said transmission being very effective in performing the functions for which it is intended.

An especially desirable feature of my invention is the construction and arrangement of parts whereby the transmission is always positively operated, either at high speed or low speed, thus entirely eliminating any neutral position of the transmission and which latter condition would be attended by danger and accidents in the event that the rider of the bicycle should endeavor to use the brake at a time when the transmission is in neutral position.

It will be understood that minor changes in the size, form and construction of the various parts of my improved two-speed bicycle transmission may be made and substituted for those herein shown and described without departing from the spirit of the invention, the scope of which is set forth in the appended claims.

I claim as my invention:

1. The combination with the pedally actuated shaft of a bicycle and the bearing for said shaft, of a housing positioned adjacent said bearing and enclosing a portion of said shaft, an internally toothed clutch member arranged within the housing on one side thereof, an internal gear arranged within the housing on the other side thereof, said internal gear being larger in diameter than said clutch member, a sleeve mounted to slide lengthwise upon and rotate with said shaft within said housing, said sleeve having two sets of teeth, one set being adapted to engage the internal teeth of the clutch member within the housing, a pair of pinions mounted for operation within the housing, one of which pinions is adapted to be engaged by the other set of teeth on said sleeve, the other one of which pinions is adapted to engage the teeth of the internal ring gear, a pair of rods mounted to slide into said housing, a bifurcated yoke carried by the inner end of one of said rods and engaging the sleeve between the teeth thereon, the other one of said sliding rods carrying the pinion that engages the teeth of the internal ring gear, a cross bar mounted for operation on the frame of the bicycle and a slotted crank arm carried by said rock shaft and engaging said cross bar between said sliding rods.

2. The combination with a pedally actuated bicycle shaft, of a housing enclosing a portion of said shaft and mounted to rotate thereon, a sprocket wheel carried by said housing, a clutch member having internal teeth secured within said housing, a plate closing the inner side of said housing, an internal ring gear secured within the housing and spaced apart from said clutch member, a sleeve mounted to rotate with and slide lengthwise upon said shaft within said housing, said sleeve having two sets of teeth, one set being adapted to engage the teeth of said clutch member, a pair of rods arranged to slide into the housing, manually operable means for imparting simultaneous sliding movement to said rods, a pair of pinions within said housing, one of which pinions is mounted for rotation on the inner end of one of said rods, the other pinion mounted for rotation on the plate that closes one of the sides of the housing, the teeth of the pinion that is carried by the sliding rod being adapted to engage the teeth of the internal ring gear, the other set of teeth on the sleeve being adapted to engage the teeth of said other pinion and means carried by the other one of the sliding rods for imparting movement to said sleeve.

3. The combination with a pedally actuated bicycle shaft, of a housing enclosing a portion of said shaft and mounted to rotate thereon, a sprocket wheel carried by said housing, a clutch member secured within said housing and provided with internally arranged teeth, a plate closing the inner side of said housing, an internal ring gear secured within the housing, a sleeve mounted to rotate with and slide lengthwise upon the shaft within the housing, said sleeve having two sets of teeth, one set adapted to engage the internal teeth of the clutch member, a pair of pinions mounted for operation within the housing, the teeth of one of which pinions are adapted to engage the teeth of the internal ring gear, the other set of teeth on said sleeve being adapted to engage the teeth of the other one of said pinions, manually operable means for shifting one of said pinions and the sleeve lengthwise of said shaft, which latter mentioned means includes a pair of rods mounted for sliding movement through the plate that closes the inner side of the housing, the inner end of one of said rods carrying the pinion that engages the teeth of the internal ring gear, a bifurcated yoke carried by the other one of said rods for engaging the sleeve between the teeth thereon, a cross bar connecting the outer ends of the sliding rods, a rock shaft journaled for operation on the frame of the bicycle and a slotted crank arm carried by said rock shaft and engaging said cross bar between said sliding rods.

4. In a two speed transmission for a bicycle, a pedally operated shaft, a drum mounted for rotation on said shaft, a sprocket wheel carried by said drum, a clutch member secured within said drum, an internal ring gear secured within said drum, said clutch member and internal ring gear having different diameters, means mounted for operation within said drum for selectively engaging and driving said clutch member and internal ring gear and manually operable means for actuating said selective driving means, which manually operable means includes a pair of rods mounted for sliding movement into said housing, the inner ends of which rods are connected to different members of the internal ring gear engaging means, a cross bar connecting the outer ends of said sliding rods, a shaft journaled for rotation on the frame of the bicycle, a slotted crank carried by said shaft and engaging said cross bar between said sliding rods, a member connected to said rock shaft for imparting movement thereto.

FRANK F. HOSMER.